Figure 4:
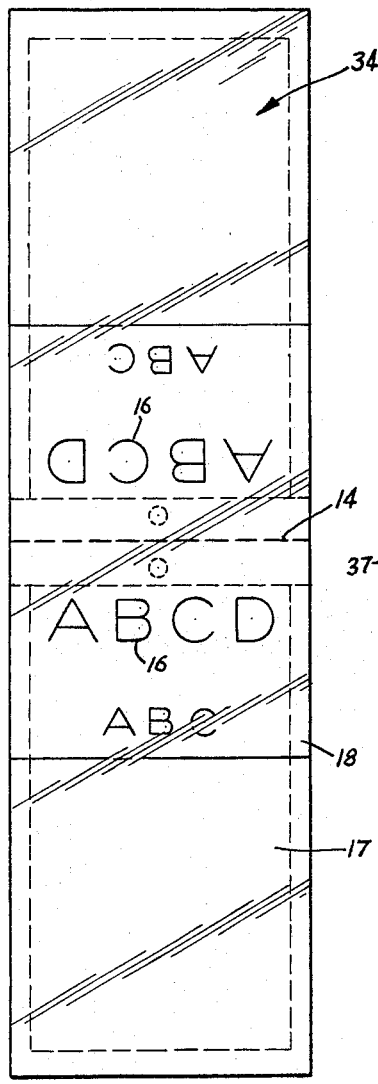

Nov. 15, 1966   N. STILLMAN ET AL   3,285,497
PACKAGING SHEET MATERIAL
Filed May 3, 1965   2 Sheets-Sheet 1
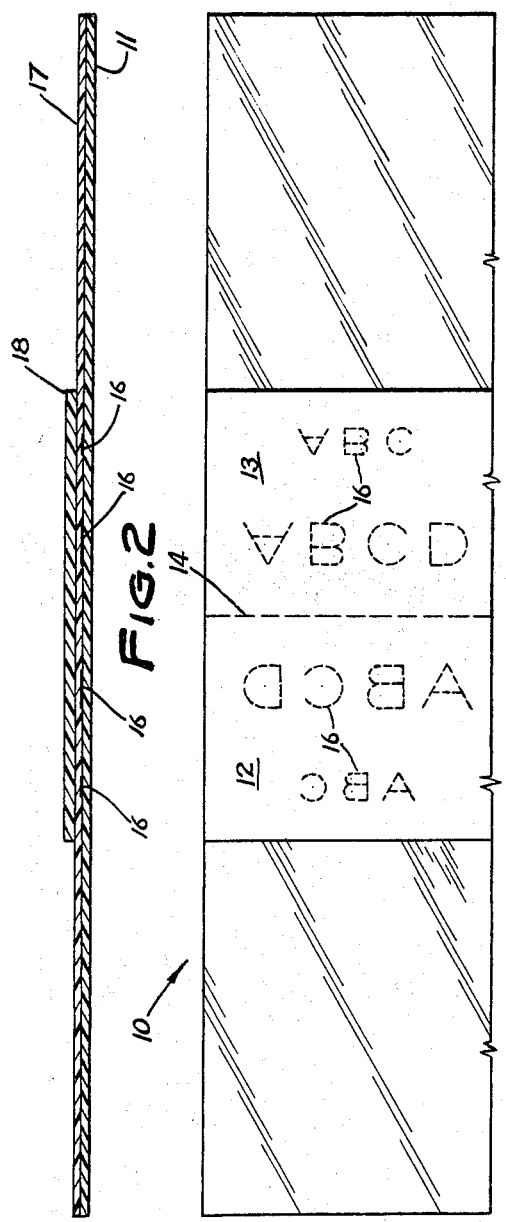
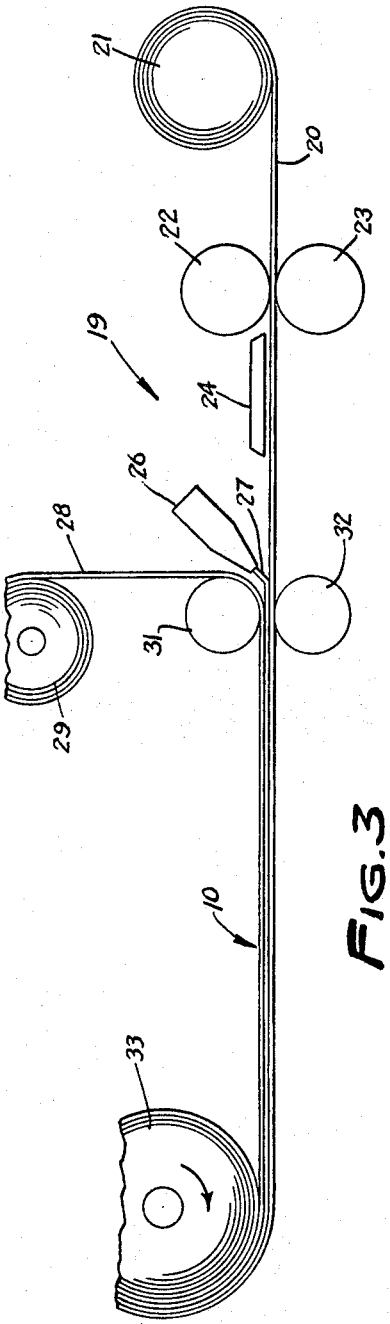
INVENTORS
NATHAN STILLMAN
GERARD R. VAN KOERSEL
CARL E. LINDROOS
By Moore, White & Burd
ATTORNEYS Nov. 15, 1966   N. STILLMAN ET AL   3,285,497
PACKAGING SHEET MATERIAL
Filed May 3, 1965   2 Sheets-Sheet 2

INVENTORS
NATHAN STILLMAN
GERARD R. VanKOERSEL
CARL E. LINDROOS
By Moore, White & Burd
ATTORNEYS

United States Patent Office 3,285,497
Patented Nov. 15, 1966

3,285,497
PACKAGING SHEET MATERIAL
Nathan Stillman, Lafayette, Gerard R. Van Koersel, Concord, and Carl E. Lindroos, Oakland, Calif., assignors to Rap Industries Inc., Minneapolis, Minn., a corporation of Ohio
Filed May 3, 1965, Ser. No. 452,586
8 Claims. (Cl. 229—55)

This invention relates to laminated roll material usable to package products and a method of forming the laminated roll material. The invention includes a method of forming a new and novel package from laminated material to accommodate and display products, such as foods, hardware, etc.

More particularly, the invention relates to a laminated film having an overall transparent thermoplastic coating for reinforcing a transparent cellulose film, while at the same time functioning as a bonding agent securing a narrower opaque thermoplastic sheet to the center of the film. The opaque sheet is positioned over reverse print on the transparent film and has a color which contrasts with the color of the print to provide a background for the print. The package is formed by folding the laminated sheet with the thermoplastic surfaces of the opaque sheet and transparent coating on opposite sides of the center line in back-to-back relation. The package is completed by heat sealing the top, side and bottom portions of the folded laminated sheet so as to form a bag or pouch having flexible front and back walls comprising a lower transparent area and an upper opaque area. By changing the position of the print and opaque sheet relative to the transparent film the position of the label on the pouch can be altered. For example, the opaque sheet could constitute all or part of the front panel of the completed pouch. Also by changing the print position the material is adaptable to back seam bags.

In the merchandising of products it is common practice in retail stores to display products in transparent packages attached to wire peg racks. When this type of display is used the products are packaged in flexible transparent bags or pouches. The product enclosed in the bag is usually identified by a separate label attached to the top end of the bag by staples, an adhesive or heat sealing. This label also serves as a header formed with a hole in the center of its top edge for receiving a lateral peg of the rack to support the package. This label has a disadvantage in that it is not part of the package and does at times tear loose from the package creating problems in identifying and displaying the goods.

In some instances advertising and design printed matter is placed directly on the plastic film so as to eliminate the separate header label. This printed matter has very little eye appeal as it is difficult and costly to apply background colors over the print to provide visual contrast between the print and remainder of the package. If ink is used with heat seal plastic film in the header area the resultant seal is weak because the plastic film becomes an integral mass in the sealing operation.

The tops of the prior plastic film bags after being provided with the header hole are relatively weak and have the disadvantage of tearing and breaking when handled by a customer. It is common practice for customers to pull the package off the peg and replace it several times. In a short period of time the header tears, making the package unattractive and less saleable.

It is the object of this invention to provide a stiff and strong flexible package having an integral header which is not susceptible to tearing and breaking and having the ability to withstand abusive customer handling and at the same time protect the accommodated products against dirt and moisture.

It is another object of the invention to provide a package from laminated film material having printed data and/or designs in conjunction with a contrasting colored background which produces gloss and brilliance to visually off set the printed data and/or designs.

Another object of the invention is to provide a laminated roll material having separate transparent and opaque sections.

A further object of the invention is to provide an improved method of forming laminated roll material with a contrasting colored print area.

Still a further object of the invention is to provide an improved method of making a package having a reinforced integral header portion, a printed area off set with a contrasting colored background and transparent area permitting visual inspection of the packaged product.

Another object of the invention is to provide a laminated roll material which can be supplied to the customer in prefabricated pouches for automatic, semi-automatic, or hand filling operations.

It is still a further object of the invention to provide a compact and integral package which is easy to handle, is capable of withstanding abusive customer treatment, may be readily grouped with other similar packages for bulk shipment, storage and display, is not subject to deterioration, and will not adversely affect the goods being accommodated.

An additional object of the invention is to provide a flexible, durable and strong laminated or roll sheet material having uniform quality, versatility in use, economy in cost of manufacture, and capable of being formed into a neat and attractive package by the use of bag closing machines now in general use in the trade.

These and other objects of the invention and the means and methods for their attainment will be more apparent from the following description taken in connection with the accompanying drawings. The following description sets forth in detail certain illustrative embodiments of the invention, these being indicative, however, of but a few of the various way in which the principles of the invention may be employed.

Figure 5:
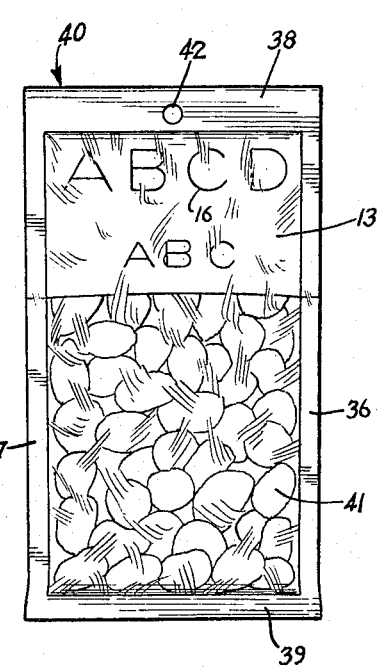
Figure 6:
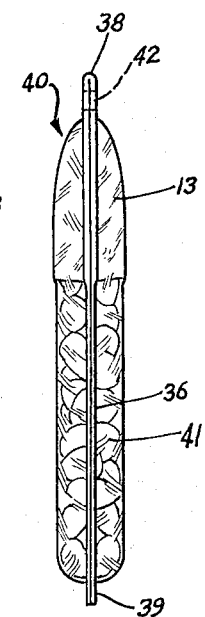

In the drawings:
FIGURE 1 is a plan view of a longitudinal section of the laminated sheet material of this invention;
FIGURE 2 is an elevational view in section of the sheet material of FIGURE 1;
FIGURE 3 is a diagrammatic view of the apparatus for making the sheet material of FIGURE 1;
FIGURE 4 is a plan view of a layout package blank of laminated sheet material indicating the peripheral areas which are heat sealed in the formation of a package;
FIGURE 5 is an elevational view of the package of this invention formed from the package blank of FIGURE 4 containing a product; and
FIGURE 6 is a side view of the package in FIGURE 5.

Referring to the drawings there is shown in FIGURES 1 and 2 laminated sheet or roll material indicated generally at 10. The laminated material 10 is a continuous web and comprises a base layer 11 of a transparent plastic film. This film is characterized as being strong and stable, relatively thin, smooth and flexible, and impervious to gas and liquids including greases and oils. Preferably, the base layer 11 is a film having sparkling transparency a thickness of about .8 mil to 1.9 mils, printability and low cost. The following packaging films are examples of suitable films which may be used as the base layer 11: cellophane or similar cellulosic film material which may be cellophane, uncoated or coated; cellulose acetate; cellulose nitrate; cellulose acetate butyrate; synthetic resinous films such as nylon, rubber hydrochloride (Pliofilm) polyester (Mylar) polypropylene, polystyrene, polyvinylidene chloride (Saran) and vinyl acetate, polyvinyl chloride and the like, and composite films composed of one or more of these materials.

Substantially equal areas 12 and 13 on opposite sides of the longitudinal center line 14 of the base layer 11 are used to accommodate reverse print 16 which may be in the form of printed information and/or design subject matter. The reverse print may be applied to only one side of the base layer 11. The print 16 is printed directly on the top surface of the base layer 11 and extends in a longitudinal direction in repeat patterns. The particular print and size of the print pattern is selected to describe and advertise the product to be packaged.

The entire side of the base layer 11 having the reverse print 16 is coated with a continuous and uniform layer of thermoplastic material 17 to provide a flexible and transparent coating capable of being fused by heat into a weld type seal. The coating 17 is characterized as a plastic film having transparent sparkling clarity, high tear strength and heat seal properties. Preferably, the coating 17 may range in thickness from about 0.4 mil to 4 mils. For example, the coating 17 may be a film of polyethylene, polypropylene, cellulose acetate, nitrocellulose polyvinylidene chloride, and vinyl copolymer. The layers as shown are greatly exaggerated as to thickness.

The equal center areas 12 and 13 of the base layer 11 having the reverse print 16 are covered with a top layer 18 of flexible opaque thermoplastic sheet material, such as preformed sheet polyethylene, cellulose acetate and similar sheet materials varying in thickness from about 1 to 4 mils. The layer 18 has a color which contrasts with the color of the print 16 to provide color background visually setting out the print. The layer 18 is an elongated thin sheet which has a width smaller than the width of the base layer 11 and only covers the longitudinal center section of the base layer 11 containing the reverse print 16. The coating of thermoplastic material 17 in addition to strengthening the base layer 11 functions as a bonding or laminating agent securing the top layer 18 to the base layer 11.

The sheet laminated material of this invention is specifically illustrated in the following example:

The base layer 11 is cellophane identified as "195 K 204" having a width of 16 inches. This particular material is a Saran coated cellophane having a yield of 19,500 square inches per pound. The center sections 12 and 13 of the cellophane are reverse printed in two colors red and blue on opposite sides of the longitudinal center line 14. The printed surface of the base layer 11 is coated with a polyethylene film having a uniform thickness of about 2 mils. The top layer 18 is white polyethylene sheeting having a width of 6½ inches and is bonded to the longitudinal center of the base layer 11 by the polyethylene film 17.

The print 16, being of colors that contrast with the white polyethylene sheet 18, is visually set off by the colored background created by the white sheet 18. This advantageous appearance is not reduced by handling the sheet material because the print 16 is protected. As shown in FIGURE 1, the reverse print 16 is sandwiched between the base layer 11 and the top layer 18 and thus is protected against abrasion as the print 16 is not exposed to the outside surfaces of the laminated sheet material 10. The color of the print 16 takes on all the snap and gloss of coating surface.

Referring to FIGURE 3 there is shown apparatus indicated generally at 19 for fabricating the laminated sheet material 10. A web of transparent sheet material 20 forming the base layer 11 moves from a supply roll 21 in an elongated path between a printing roller 22 and a back-up roller 23. The printing roller 22 reverse prints written information and/or design patterns, in longitudinal sequence or repeat patterns along the mid-section of the web of sheet material 20. The particular print is selected according to the ultimate use of the laminated sheet material. In some instances it may be desirable to reverse print several longitudinal sections of the moving sheet material 20 or a longitudinal section off set from the mid-section.

As the web of sheet material 20 leaves the printing roller 22 it moves under a drier unit 24 which sets and dries the print. The drier unit 24 is a conventional unit which may operate as a heater or blower for moving air over the printed surface of the moving sheet material.

As the sheet material 20 moves along the elongated path a liquid applicator 26, shown as an extruder, discharges a thin film 27 of liquid thermoplastic material onto the entire top surface of the sheet material 20. The thermoplastic material 27 is in a liquid state as it is heated in the applicator 26. As the hot liquid material 27 is deposited on the moving sheet material 20 the entire top surface is coated with a continuous and substantially uniform film of liquid thermoplastic material. The thickness of this film may be varied by changing the speed of movement of the sheet material 20 relative to the discharge rate of thermoplastic material 27 from the extruder 26. The hot thermoplastic material on cooling sets and adheres to the sheet material 20 providing the sheet material with increased tear resistance and puncture resistance without affecting its transparency.

Immediately after coating the sheet material 20 with thermoplastic material 27 a web of opaque thermoplastic sheet material 28 corresponding to the top layer 18 is continuously unrolled from a supply roll 29 and pressed on the top of the thermoplastic material 27 covering the print 16 applied to the sheet material 20 by the printing roller 22. The opaque sheet material has sufficient area to cover all the print 16 so as to provide a contrasting background for the print. This is accomplished with a pressure assembly including a pressure roller 31 engaging a support roller 32. The web of thermoplastic sheet material 28 moves under pressure roller 31 and into flat surface engagement with the hot film 27. As the sheet material 20, the film of thermoplastic material 27 and the web of sheet material 28 moves between the pressure roller 31 and the support roller 32 the liquid thermoplastic material 27 is evenly spread over the entire top surface of the sheet material 20 and effects a bond between the sheet material 28 and the base sheet material 20. On cooling the thermoplastic film 27 sets whereupon the laminated sheet material 10 is a one-piece sheet.

A take-up roll 33 receives the laminated sheet material discharged by the rollers 31 and 32. Suitable drive means (not shown) coupled to the roll 33 functions to move the web of transparent sheet material 20 in the elongated path wherein the top surface of this web receives in sequence reverse print from the printing roll 22, a film of transparent thermoplastic material 27 from the extruder 26 and a top web of opaque thermoplastic sheet material 28 from the supply roll 29.

In terms of a method of forming laminated sheet material the sheet 20 is moved in an elongated path by the pulling force of the take-up roller 33. As the sheet 20 moves in the elongated path reverse print is printed on the top surface of the sheet along the longitudinal center section thereof. The reverse print 16 is applied in repeat patterns longitudinally on the center section of the sheet 20.

This print 16 is subjected to drying action by the drier unit 24 to affix the print to the top surface of the web 20. The entire top surface of the sheet 20 is then coated with a thin transparent film of thermoplastic material 27 to provide the sheet 20 with increased tear and puncture resistance. The film of thermoplastic material 27 is applied to the top surface of moving sheet 20 as a hot liquid which flows into a continuous and uniform layer coating the entire top surface of sheet 20.

Immediately after the film of thermoplastic material 27 has been applied to the entire top surface of sheet 20 an opaque sheet of thermoplastic material 28 is continuously placed on top of film 27 to cover the print 16 on sheet 20. The opaque sheet is positioned longitudinally over the center section of the sheet 20. To increase the visual characteristics of the print the opaque sheet of thermoplastic material 28 is of a color which sharply contrasts with the color of the print.

As the hot thermoplastic film 27 cools the transparent sheet 20 and the opaque sheet 28 are uniformly subjected to squeezing pressure to evenly distribute the film 27 and firmly bond sheet 28 to sheet 20 forming laminated sheet material 10. After the laminated sheet material 10 has cooled it is continuously collected on take-up roll 33.

In using the laminated sheet material 10 to fabricate packages the material is cut in transverse strips to form package blanks. A single package blank 34 is shown in FIGURE 4. This blank has a rectangular shape with the opaque top layer 18 extended across the print 16. The opposite outer sections of the blank are transparent.

In forming the package the blank 34 is folded along the center line 14 to provide adjacent flexible side walls. The blank 34 is folded in half along the longitudinal line 14 positioning the thermoplastic coating 17 in face-to-face relation. The peripheral side edges 36 and 37 and the header 38 are united with a conventional heat seal device to form a weld-type seal. This is accomplished by heating the peripheral edge and header to a temperature between 250 and 350° F. Prior to the sealing of the bottom edge 39 the product 41 is placed in the package. With the heat sealing of the bottom edge 39 as shown in FIGURES 5 and 6 the product 41 is confined to the package. The hole 42 is placed in the center of the header 38 to facilitate the hanging of the package from a peg rack display.

As shown in FIGURE 5, the completed package 40 has a transparent lower section permitting the visual inspection of confined product 41 and yet protects the product from moisture and dirt. The upper section of the package carries the print 16 and the opaque background which clearly brings out the print. In addition, the top layer 18 being doubled over provides the header 38 with added strength so as to minimize the tearing of the header adjacent the hole 42. Since the top of the header 38 is a fold edge rather than a cut edge there is increased resistance to tearing.

In terms of a method of making a series of packages for accommodating products, such as food and hardware, the invention comprises the steps of providing a flexible laminated sheet 10 having a heat sealable coating and an integral colored background layer positioned over reverse print. The sheet is then folded in half forming flexible front and back walls with the heat sealable coating in face-to-face contact. After the laminated roll 10 has been folded it is transversely heat sealed at longitudinally spaced intervals and continuously sealed along the bottom to form a header. The folded sheet is thus provided with a plurality of separate pockets each having an open top for receiving the product to be packaged.

The product 41 is then placed into the package. This may be accomplished with the use of a conventional bag filling machine. In the dispensing of the product into the packages the sheet 10 is folded upwardly so that the packages are in an inverted position wherein the transparent areas are available for visual inspection of the operation of the filling machine.

It is apparent that many modifications and variations of this invention as hereinbefore set forth may be made without departing from the spirit and scope thereof. The specific embodiments described are given by way of example only and the invention is limited only by the terms of the appended claims.

What is claimed is:
1. A laminated sheet material for making heat sealable packages comprising
   (a) a web of cellophane,
   (b) a repeating pattern of reverse print extending longitudinally along the mid-section of one surface of the web of cellophane,
   (c) a film of polyethylene about 2 mils in thickness bonded to and covering the entire printed surface of the web of cellophane, and
   (d) a narrower white web of polyethylene about 2 mils in thickness bonded to said film of polyethylene covering the printed mid-section of the web of cellophane.

2. A laminated sheet material for making heat sealable packages comprising
   (a) a web of cellophane,
   (b) a repeating pattern of reverse print extending longitudinally along the mid-section of one surface of the web of cellophane,
   (c) a film of polyethylene from about 0.4 mil to 4 mils in thickness bonded to and covering said printed surface of the sheet of cellophane, and
   (d) a narrower opaque web of polyethylene of color contrasting with the color of said reverse print bonded to said film of polyethylene covering the printed mid-section of the web of cellophane.

3. A laminated sheet material for making heat sealable packages comprising
   (a) a web of thin transparent and flexible material,
   (b) a repeating pattern of reverse print extending along at least one longitudinal center section of one surface of the web material,
   (c) a layer of transparent thermoplastic material coating said printed surface of the web material, and
   (d) a narrower web of thermoplastic material of a color which contrasts with the color of the reverse print positioned on said layer of transparent thermoplastic material covering said reverse print.

4. A package for enclosing a product comprising a front wall and a rear wall on opposite sides of the product, each wall having an opaque top section and a transparent bottom section, reverse print on adjacent surfaces of the top sections of the walls, said walls including a thin film of thermoplastic material coating the entire adjacent surfaces of the walls, a single sheet of thermoplastic material having a color which contrasts with the color of the print forming a background therefor bonded by the film of thermoplastic material to the top sections of the walls, said front and rear walls peripherally interconnected by a continuous welded union of the peripheral portions of the film of thermoplastic material and the sheet of thermoplastic material and the front and rear walls being further interconnected along the top edge of the package along a common fold line, said welded top edge forming an integral header for said package and having means for supporting said package.

5. A package for enclosing a product comprising a flexible front wall and a flexible rear wall, interconnected along a common fold line, each wall having a first section adjacent said fold line and a second transparent section, reverse print on the first section of each wall, said walls including a thin film of thermoplastic material coating the surface having the reverse print, and sheet means of thermoplastic material having a color which contrasts with the color of the print bonded by the film of thermoplastic material to said first sections of the walls and forming a background for the print, said front and rear walls further peripherally interconnected by a continuous welded union of the peripheral portions of the film of thermoplastic material.

6. A package for enclosing a product comprising a flexible front wall and a flexible rear wall interconnected along a common fold line, the peripheral edges of said front wall and rear wall disposed in face-to-face seal contact, at least one wall having a first transparent section and a second section having reverse print on the inner surface thereof and a sheet of material having a color which contrasts with the color of the print, said sheet material positioned inwardly of the print forming a background therefor.

7. A flexible walled package for enclosing a product contained therein comprising a sheet of laminated material having a base film folded in half to form a front section and a back section, reverse print on the facing surfaces of the front and back sections, said front and back sections having heat sealable coatings in face-to-face contact, thermoplastic sheet means having a color which contrasts with the color of the print overlying the print and bonded to the base film by the coating, said front and back sections peripherally interconnected by a continuous heat seal weld.

8. A flexible walled package for enclosing a product contained therein comprising a sheet of laminated material having a base film folded to form a front section and a back section, print on at least one surface of either the front and back sections, said front and back sections having heat sealable coatings in face-to-face contact, thermoplastic sheet means having a color which contrasts with the color of the print overlying the print and bonded to the base film by the coating, said front and back sections peripherally interconnected by a continuous heat seal weld.

References Cited by the Examiner

UNITED STATES PATENTS

| | | | |
|---|---|---|---|
| 2,370,419 | 2/1945 | Ray | 229—3.5 |
| 2,919,059 | 12/1959 | Sporka | 229—3.5 |
| 2,923,404 | 2/1960 | Adell | 206—56 |
| 2,929,180 | 3/1960 | Abrams et al. | 53—29 |
| 2,977,729 | 4/1961 | Frechtmann et al. | 53—29 |
| 3,024,962 | 3/1962 | Meister | 229—62 |

JOSEPH R. LECLAIR, *Primary Examiner.*

DAVID M. BOCKENEK, *Examiner.*